US011470195B2

(12) United States Patent
Sharma et al.

(10) Patent No.: US 11,470,195 B2
(45) Date of Patent: Oct. 11, 2022

(54) CONFIGURABLE AUTO-ANSWER FOR INCOMING COMMUNICATION REQUESTS

(71) Applicant: Avaya Inc., Santa Clara, CA (US)

(72) Inventors: Arjun Sharma, Pune (IN); Sachin Bhangale, Pune (IN); Vishal Kamboj, Pune (IN); Amir Mulani, Pune (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/690,790

(22) Filed: Nov. 21, 2019

(65) Prior Publication Data

US 2021/0160369 A1 May 27, 2021

(51) Int. Cl.
*H04M 3/51* (2006.01)
*H04M 3/436* (2006.01)

(52) U.S. Cl.
CPC .......... *H04M 3/51* (2013.01); *H04M 3/436* (2013.01)

(58) Field of Classification Search
CPC .... H04M 3/51; H04M 3/436; H04M 3/42365; H04M 3/5235; H04M 3/42034
See application file for complete search history.

(56) References Cited

U.S. PATENT DOCUMENTS

| 6,754,509 B1* | 6/2004 | Khan | H04B 1/3805 |
| | | | 455/556.1 |
| 2004/0225679 A1* | 11/2004 | Oran | H04M 3/436 |
| 2013/0189963 A1* | 7/2013 | Epp | H04M 1/64 |
| | | | 455/414.1 |
| 2015/0004965 A1* | 1/2015 | Tanabe | H04L 65/1006 |
| | | | 455/426.1 |
| 2018/0309801 A1* | 10/2018 | Rathod | H04L 65/1069 |

OTHER PUBLICATIONS

"Auto Answer," Avaya, 1408/1416 Phone User Guide, Apr. 16, 2020, 1 page [retrieved online from: ipofficekb.avaya.com/user/ipoffice/mergedProjects/1408/auto_answer.htm].

* cited by examiner

*Primary Examiner* — Ahmad F. Matar
*Assistant Examiner* — Jirapon Intavong
(74) *Attorney, Agent, or Firm* — Sheridan Ross P.C.

(57) ABSTRACT

Systems and methods are described that enable an incoming communication requesting a real-time (e.g., voice, voice-video, etc.) communication and selectively allowing the called communication device to auto-answer the communication. The selective answering may be rule and/or attribute based and depend, entirely or in part, on presence data of a user associated with the called communication device. Auto-answering may be further configured to auto-answer all or less than all of the communication media types (e.g., only auto-answer an audio-video call with audio). Additionally, or alternatively, rules may be combined, overridden, conditionally implemented, or otherwise combined or structured relative to other rules for auto-answering an incoming communication.

20 Claims, 5 Drawing Sheets

| | |
|---|---|
| User 1: Available | Authorize |
| User 2: Available | Evaluate contacts |
| User 1: In Meeting | Deny all |
| User 2: in Meeing | Authorize "Project A" members |

*Fig. 2*

| | |
|---|---|
| Alice | Authorize |
| Bob | Not Authorized |
| Charles | Authorized |
| David | Audio only authorized |

*Fig. 3*

CONFIGURABLE AUTO-ANSWER FOR INCOMING COMMUNICATION REQUESTS

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for networked communications and particularly to selectively enabling a communication between nodes on a network.

BACKGROUND

Communications between communication devices, serving as nodes on a network, continue to evolve. Communication devices, such as user devices that enable users to communicate via the network with one or more other communication devices in audio, video, text, document exchanges, co-browsing, and other media types provide further enhancements to have and conduct communications. Despite the advancements in the prior art in communications, problems and opportunities to advance the state of the art remain.

SUMMARY

It is often desirable to allow a request for a communication to be "auto answered." While auto-answer may be desirable for certain communications, such as those originating from designated contacts or devices and/or having other authorizing attributes (e.g., time of day, day of week, recipient user's presence status, media type, etc.), it may or may not be desirable to universally allow all incoming communication requests to be auto-answered.

In one embodiment, a user device is configured to selectively allow certain incoming communication requests to be auto-answered. In another embodiment, all incoming communication requests that are not specifically identified for auto-answer may be denied auto-answer and processed via other means. Incoming communication requests may be for any type of between two or more humans providing input to, and receiving output from, at least two communication devices in communication via a network or networks for communication in a real-time communication format (e.g., audio (voice), audio/video) and may be referred to herein as a "call" or, if unanswered, an "incoming call." An incoming call is a request for the communication and once the incoming call is answered, via auto-answer, manual answer (e.g., off-hook), automatic answer (e.g., interactive voice response, voicemail, etc.), forwarding, forking, etc., the call is active and data (e.g., analog signals and/or digital media) is exchanged between the user devices engaged in the call. Accordingly, certain embodiments herein may be utilized with networks comprising circuit-switched, packet-switched, or a combination thereof for connecting and/or routing communications. Examples of networks utilized herein include, but are not limited to, Plan Old Telephone Systems (POTS), Session Initiation Protocol (SIP), voice over internet protocol (VoIP), cellular, and WiFi, and/or other communication networks operable to enable a communication between user devices. The user devices are provided as human-machine interface and convert the data exchanged between another user device to and from human perceivable form(s), such as images presented on a display or captured by a camera, sound from a speaker or received by a microphone, Braille or other assistance devices, etc.

In one embodiment, a user device and/or communication component associated with the user and/or user device, may be configured to selectively enable auto-answering of calls by the user device. The user device may be configured to auto-answer for selected contacts and/or other attributes of the incoming call, user, user device, or other component. In a further embodiment, a user may have their presence information known which may be utilized alone or with caller information or other attribute to further refine when a call should be auto-answered. For example, a user may only allow auto-answer when their status is "available." In another example, a user's auto-answer may be set to "always" wherein presence status is ignored and calls are eligible to be auto-answered regardless of the user's presence status.

In another embodiment, the modality of the auto-answer may be configured. For example, an incoming audio-only call may be auto-answered in audio or not auto-answered. In another example, an incoming audio-video call may be configured to be auto-answered as either an audio-only call or an audio-video. Accordingly, all or less than all communication data types of an incoming call may be auto-answered.

In another embodiment, the called user device may be unable to accept the call, such as being already engaged in a different communication. If the called user device is busy, the call may be processed normally without regard to the auto-answer functionality, such as to "ring busy," route to voicemail, forward to a delegate user device, etc.

It should be appreciated that caller, calling device, or other attributes utilized to determine whether or not a call is to be auto-answered, may be provided with a hierarchy or order of operations such that certain attributes may override other attributes or otherwise be combined to form a structured auto-answering rule. As one example, calls from users A, B, and C may be auto-answered, but only within business hours. Calls from user B may be auto-answered outside of normal business hours but only if the call is originating from a particular location or user device. Calls from user C may be auto answered outside of business hours but only if the call is audio-video and then the call is auto-answered in audio only.

As an example, a user has been admitted to a hospital and has an associated user device. The user device may be configured to allow audio or audio-video auto-answering when the call originates from particular calling user devices or users. Accordingly, authorized friends and family may call and, even if the user is sleeping, allow the user to see (if auto-answer in video is authorized) the patent to obtain certain information without disturbing their sleep. In another example, all calls received from a particular location (e.g., security office) may be auto-answered, regardless of any other rule, such as to facilitate an appropriate response to an emergency situation.

These and other needs are addressed by the various embodiments and configurations of the present invention. The present invention can provide a number of advantages depending on the particular configuration. These and other advantages will be apparent from the disclosure of the invention(s) contained herein.

In one embodiment, a system is disclosed, comprising: a microprocessor having a memory; a data storage accessible to the processor; a network interface to a network to enable a communication comprising the system and a calling device via the network; and the microprocessor performs: receiving a signal associated with an incoming communication request via the network; accessing, from the data storage, an auto-answer rule; accessing an auto-answer attribute; and evaluating the auto-answer attribute with the auto-answer rule to produce an auto-answer decision to auto-answer or not auto-answer the communication; and upon the auto-answer decision being evaluated to auto-answer the communication, connecting to the incoming communication to enable a real-time communication comprising the system and the calling device.

In other embodiment, a method is disclosed for selectively auto-answering an incoming communication request by a microprocessor, comprising: receiving a signal associated with an incoming communication request via a network; accessing, from a data storage, an auto-answer rule; accessing an auto-answer attribute; evaluating the auto-answer attribute with the auto-answer rule to produce an auto-answer decision to auto-answer or not auto-answer the communication; and upon the auto-answer decision being evaluated to auto-answer the communication, connecting to the incoming communication to enable a real-time communication comprising a user communication device and a calling device originating the incoming communication request.

In another embodiment, a system is disclosed for selectively auto-answering an incoming communication request by a microprocessor, comprising: means to receive a signal associated with an incoming communication request via a network; means to access, from a data storage, an auto-answer rule; means to access an auto-answer attribute; means to evaluate the auto-answer attribute with the auto-answer rule to produce an auto-answer decision to auto-answer or not auto-answer the communication; and means to connect, upon the means to evaluate auto-answer decision is evaluated to auto-answer the communication, to the incoming communication to enable a real-time communication comprising a user communication device and a calling device originating the incoming communication request.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(1) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 2 depicts a first data structure in accordance with embodiments of the present disclosure;

FIG. 3 depicts a second data structure in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
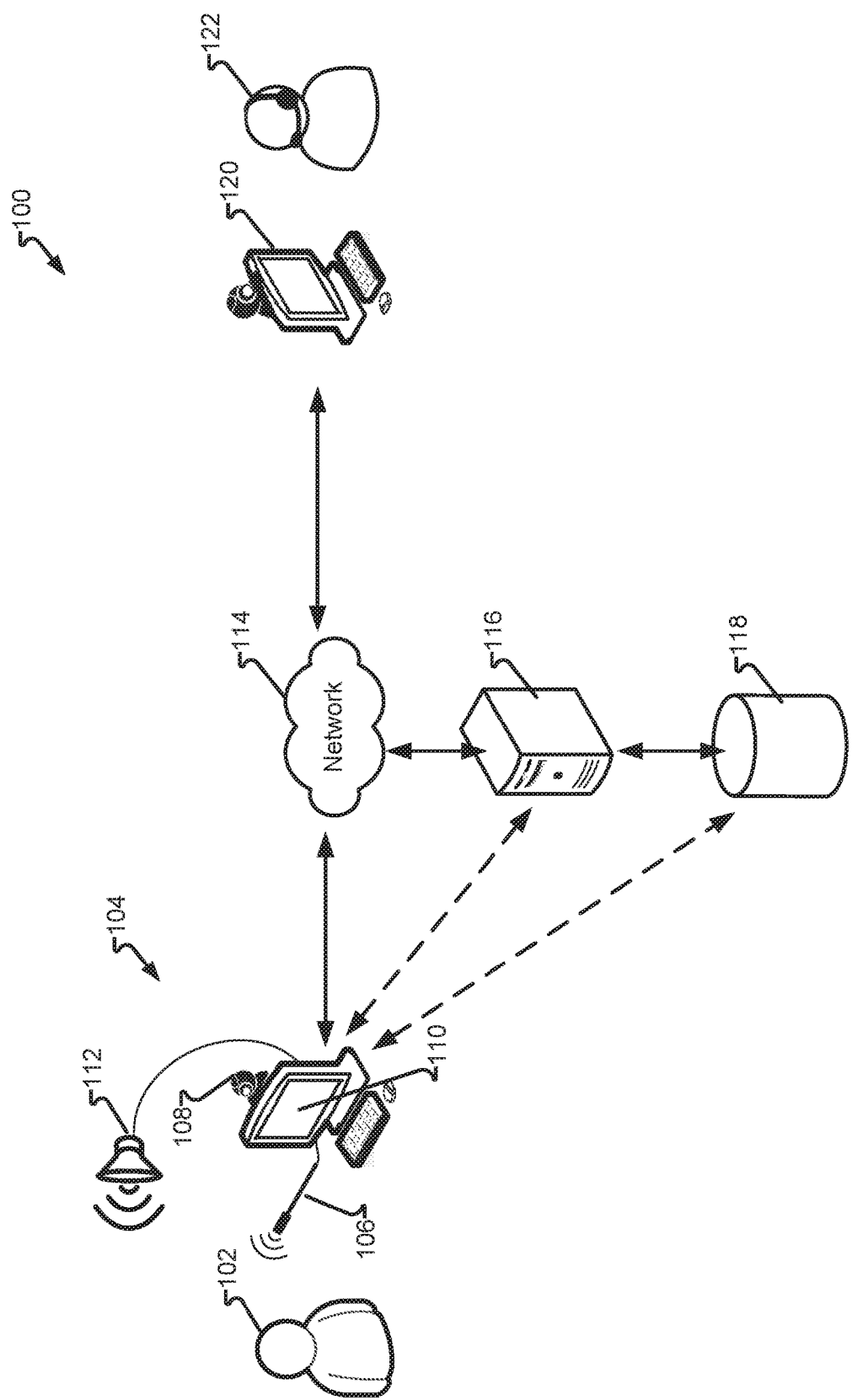
FIG. 1 depicts a first system in accordance with embodiments of the present disclosure.

FIG. 1 depicts system 100 in accordance with embodiments of the present disclosure. In one embodiment, system 100 comprises user communication device 104 receiving a request for a communication originating from calling device 120. The request may be a SIP "INVITE" message or similar message, appropriate for the communication protocol utilized, to signal the callee device (user communication device 104) that a caller device (calling device 120) is requesting a communication with user 102 via user communication device 104.

As previously mentioned, the communication request embodied herein are limited to real-time point-to-point communications utilizing network 114 and will generally support full-duplex communications, whether or not implemented in a particular communication and, more specifically still, may comprise data encoded for transmission via network 114 comprising audio, video, both audio-video, or other real-time communication. In another embodiment, messaging communications, such as messages encoded as text (e.g., text messages, text chat, post-and-reply, and email, etc.), which do not require a receiving device to first agree to the establishment of the particular communication session (e.g., answer a call), are not considered real-time communications.

User communication device 104 is variously embodied and may comprise one or more human-machine interface components, include, but not limited to, speaker 112, microphone 106, camera 108, and video display 110 to enable user 102 to, one or more of, see, be seen, hear, be heard utilizing the data encoded and transmitted via network 114 between user communication device 104 and calling device 120. Calling device 120 may similarly comprise audio, video, or audio-video input/output device or components for similarly presenting and receiving data for encoding/decoding during a communication.

In one embodiment, calling device 120 initiates a call request to user communication device 104 and, in response to receiving the request, selectively auto-answers the call to establish a communication with calling device 120. In another device, an incoming call is auto-answered by communication server 116 and communication server 116 then causes user communication device 104 to be connected to calling device 120 and thereby establishes the resulting communication between user communication device 104 and calling device 120 without any required human action or input on the part of the callee (e.g., user 102). Data storage 118 may be embodied as an internal or external storage device or other data repository appliance or component to maintain data and/or rules utilized by a microprocessor in user communication device 104 and/or communication server 116 to determine whether or not to auto-answer a particular incoming communication.

Upon receiving a communication request, user communication device 104 and/or communication server 116 determines whether or not to auto-answer the communication by evaluating one or more auto-answer attributes against one or more auto-answer rules to make an auto-answer decision, as will be discussed more completely with respect to FIGS. 2-5. If the callee is unable to accept the call (e.g., presence for user 102 is "unavailable") or user communication device 104 busy, inoperable, presently configured to decline all calls, or algorithmically determines not to auto-answer the call, then a default, non-auto-answer, action may be executed. The non-auto-answer decision may include at least one of routing the call to voicemail, forwarding the call to a designated endpoint, "ring busy" to calling device 120, or reply to calling device 120 with a "busy" message, such as a "486 BUSY" SIP message.

The decision to auto-answer the call may comprise answering less than all of the requested media types. For example, a call request may be for an audio-video communication. The auto-answer decision may accept one of the audio or video communication types and reject the other. Where separate channels are utilized for audio and video, this may establish only those channels selected for auto-answer. In other embodiments, this may be merely muting or not encoding a signal utilized for the non-included communication type. For example, camera 108 may be capturing an image received by a microprocessor of user communication device 104, but user communication device 104 may determine to auto-answer the call with audio only. Accordingly, the microprocessor may execute an audio-only CODEC or an audio-video CODEC with blank or alternate image (e.g., static image or message) or otherwise ignore or discard the output from camera 108 for encoding into the communication. In response to the request for the communication, user communication device 104 selectively auto-answers the call and thereby initiates the transfer of the encoded data via network 114, such as in a real-time transfer protocol (RTP) data transfer between user communication device 104 and calling device 120.

With respect to FIGS. 2-5, data structures are described for use by a microprocessor, such as a microprocessor of user communication device 104, communication server 116, or a combination thereof to make, in whole or in part, an auto-answer decision from auto-answer attributes and/or auto-answer rules provided therein. If a decision is made to auto-answer a communication request, which communication types to auto-answer.

FIG. 2 depicts data structure 200 in accordance with embodiments of the present disclosure. In one embodiment, data structure 200 comprises records 206 with data elements for user presence element 202 and auto-answer decision element 204. Data structure 200 may be utilized by a microprocess having access to presence information, such as one executing on at least one of user communication device 104 or communication server 116 and having access to presence information associated with at least user 102.

In one embodiment, "User 1" (an identifier for one embodiment of a user 102) when currently available, as indicated in user presence field 202 and incoming calls are authorized for auto-answer as indicated by auto-answer decision element 204, as illustrated by record 206A. In another embodiment, "User 2" (an identifier for one embodiment of a user 102), when available, as indicated in user presence field 202 and incoming calls are further evaluated against the contacts for the user and authorized, or not authorized, for auto-answer as indicated by the particular contact entry for the identity of the calling user (e.g., requesting user 122) and/or requesting device (e.g., calling device 120), as illustrated by record 206B. In another embodiment, "User 1" (an identifier for one embodiment of a user 102) when "in a meeting," as indicated in user presence field 202 and incoming calls are denied auto-answer, as illustrated by record 206C. In another embodiment, "User 2" (an identifier for one embodiment of a user 102) when "in a meeting," as indicated in user presence field 202 and incoming calls are auto-answered if the identity of the calling user (e.g., requesting user 122) and/or requesting device (e.g., calling device 120) is associated with "Project A", such as may be identified in a Lightweight Directory Access Protocol (LDAP) or other contact entry, as illustrated by record 206D.

FIG. 3 depicts data structure 300 in accordance with embodiments of the present disclosure. In one embodiment, data structure 300 comprises, is comprised by, or co-implemented with a directory of contacts, such as an LDAP. Upon receiving a request for a communication from an entry of caller field 302 the microprocessor evaluates the auto-answer decision in field 304. This may be determinative (e.g., auto-answer authorized or not authorized), conditional, such as by executing an identified rule, or subject to further evaluation, as illustrated in ones of records 306.

Figure 4:
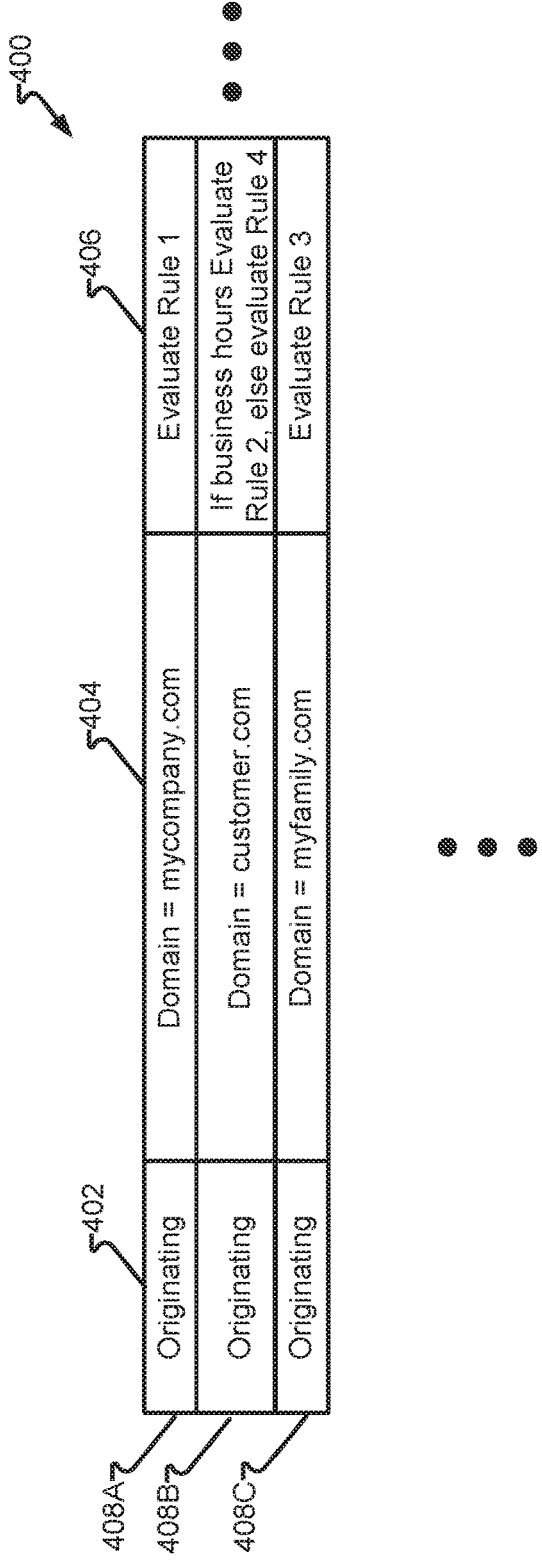
FIG. 4 depicts a third data structure in accordance with embodiments of the present disclosure.

FIG. 4 depicts data structure 400 in accordance with embodiments of the present disclosure. In one embodiment, data structure 400 comprises records 408 having an auto-answer type element field 402, auto-answer attribute 404, and auto-answer decision 406. In one embodiment, a microprocessor may evaluate auto-type element 402 as a category. For example, "originating" when used with entries in the auto-answer attribute 404 may be combined, such as "when 'Originating' has a domain of 'mycompany.com' then the decision to auto-auto answer will be provided by evaluating 'Rule 1'", such as illustrated by record 408A.

Figure 5:
FIG. 5 depicts a fourth data structure in accordance with embodiments of the present disclosure.

FIG. 5 depicts data structure 500 in accordance with embodiments of the present disclosure. In one embodiment, data structure 500 comprises records 506 having rule identifier field 502 and rule field 504. A microprocessor, when evaluating a particular auto-answer rule, may find the result 'nested,' by incorporating another rule.

The embodiments illustrated in FIGS. 2-5 may be combined, ordered, extended, truncated, or otherwise altered to provide other embodiments and results in a rule or algorithm that satisfy a particular auto-answer objective. It should be appreciated that additional fields and records may be provided as illustrated by the ellipses.

Figure 6:
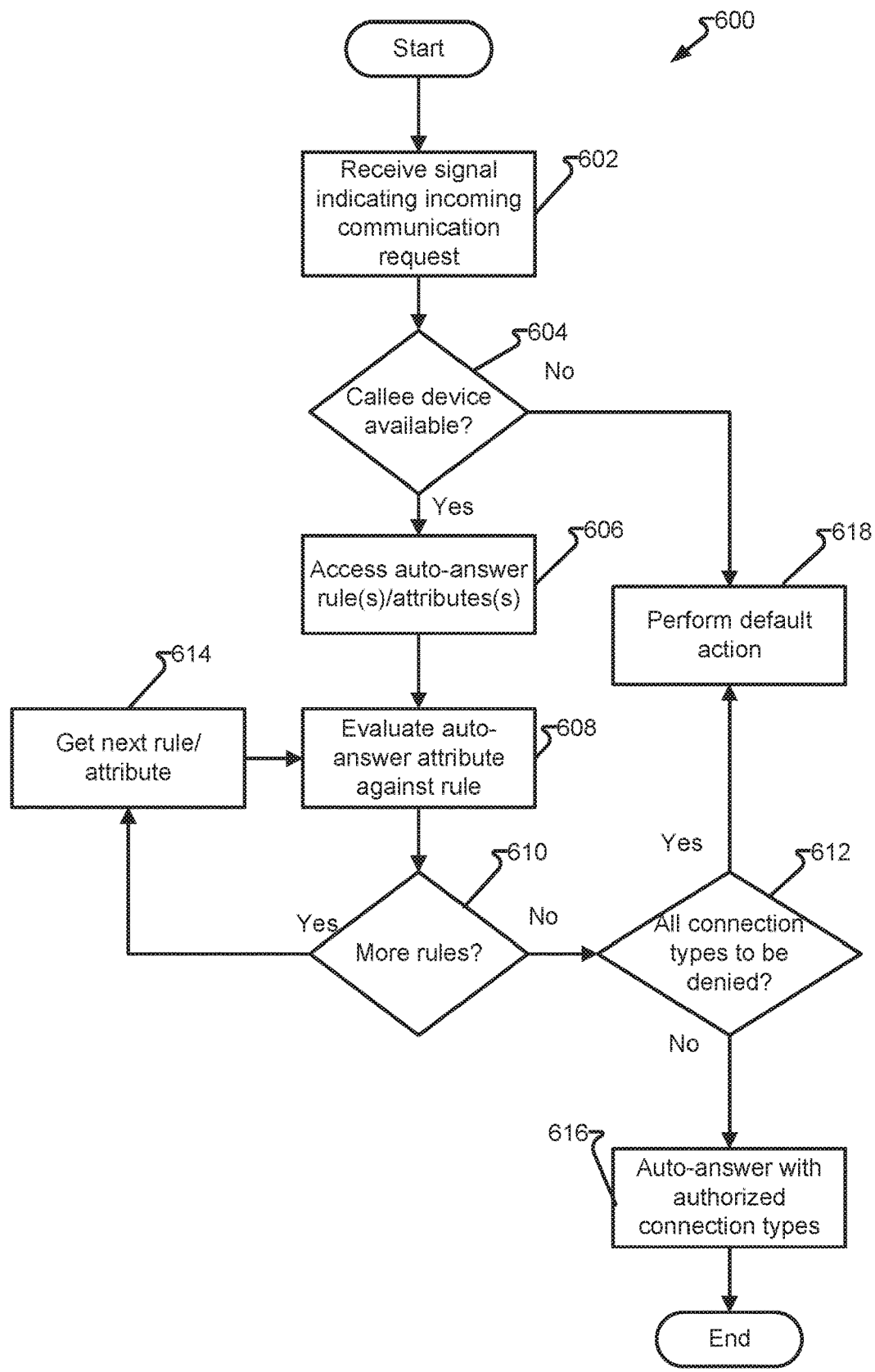
FIG. 6 depicts a process in accordance with embodiments of the present disclosure.

FIG. 6 depicts process 600 in accordance with embodiments of the present disclosure. In one embodiment, process 600 may be converted into machine-readable and executable instructions and maintained in a non-transitory storage device, such as data storage 118, for execution by a microprocessor, such as a microprocessor of user communication device 104 and/or communication server 116. Process 600 begins and step 602 receives a signal indicating an incoming communication request. Step 602 may be received directly by a callee device, such as user communication device 104 or by an associated communication managing device, such as communication server 116. Step 602 may comprise a particular voltage, in an analog based system or encoded message, such as a SIP "INVITE" message.

Next, test 604 determines if the callee device is available, which may comprise determining if the callee device (e.g., user communication device 104) is in-use, operational, or in another state that would allow the incoming call to be auto-answered. If test 604 is determined in the negative, step 618 performs a default operation, such as to reply with "BUSY", ring busy, forward the call, route the call to voicemail, etc. If test 604 is determined in the affirmative, step 606 is executed and at least one auto-answer attribute and at least one auto-answer rule is selected. The particular attribute selected may be determined by a particular rule, such as those described with respect to FIGS. 2-5. For example, if a rule is to auto-answer the call if the originator is a particular use, then the auto-answer attribute may comprise an identifier of the caller (e.g., requesting user 122) and/or calling device (e.g., calling device 120) associated with the particular user. As can be appreciated by those of ordinary skill in the art, attributes may be utilized to select a particular rule and rules may determine the selection of a particular attribute. For example, while calls originating from a particular user may be auto-answered during business hours, the current time may be accessed as one auto-answer attribute in order to determine whether or not it is current within business hours.

Step 608 then evaluates the auto-answer attribute with the associated auto-answer rule and test 610 determines if there are more rules/attributes for evaluation, such as a 'nested' or structured hierarch of rules. If test 610 is determined in the affirmative, test 614 accesses the next rule and/or attribute for evaluation in step 608. When all rules/attributes have been evaluated, such as a final conclusion as to whether or not the call should be auto-answered, test 610 is determined in the negative and processing continues to test 612. If test 612 concludes that all connection types are to be declined for auto-answer, processing may continue to step 618 and process 600 may end. If test 612 is determined in the negative, then step 616 answers the call with the communication types identified.

Figure 7:
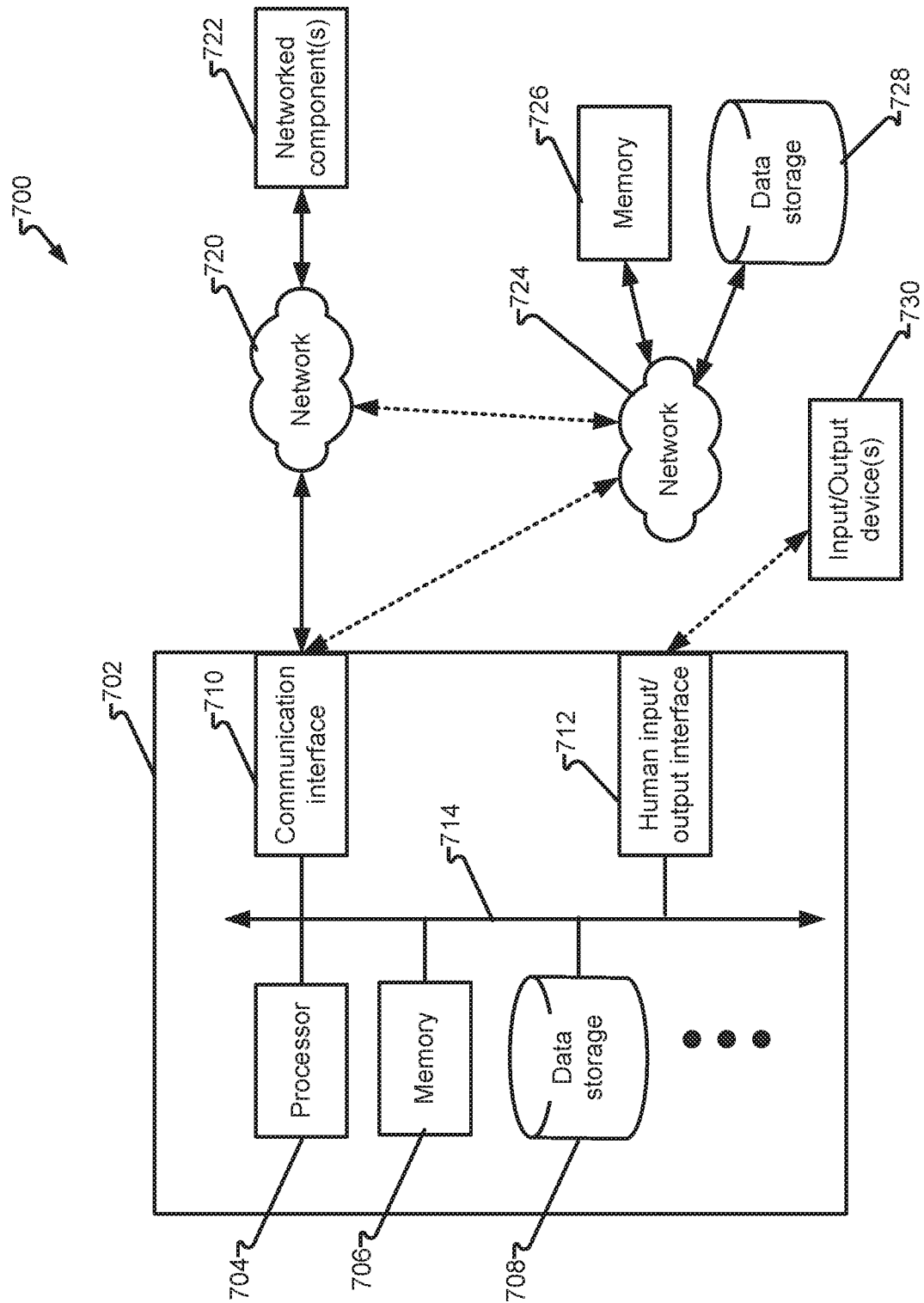
FIG. 7 depicts a second system in accordance with embodiments of the present disclosure.

FIG. 7 depicts device 702 in system 700 in accordance with embodiments of the present disclosure. In one embodiment, user communication device 104 may be embodied, in whole or in part, as device 702 comprising various components and connections to other components and/or systems. The components are variously embodied and may comprise processor 704. Processor 704 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 714, executes instructions, and outputs data, again such as via bus 714.

In addition to the components of processor 704, device 702 may utilize memory 706 and/or data storage 708 for the storage of accessible data, such as instructions, values, etc. Communication interface 710 facilitates communication with components, such as processor 704 via bus 714 with components not accessible via bus 714. Communication interface 710 may be embodied as a network port, card, cable, or other configured hardware device. Additionally or alternatively, input/output interface 712 connects to one or more interface components to receive and/or present information (e.g., instructions, data, values, etc.) to and/or from a human and/or electronic device. Examples of input/output devices 730 that may be connected to input/output interface include, but are not limited to, keyboard, mouse, trackball, printers, displays, sensor, switch, relay, etc. In another embodiment, communication interface 710 may comprise, or be comprised by, input/output interface 712. Communication interface 710 may be configured to communicate directly with a networked component or utilize one or more networks, such as network 720 and/or network 724.

Network 114 may be embodied, in whole or in part, as network 720. Network 720 may be a wired network (e.g., Ethernet, digital public network (Internet), digital private network), wireless (e.g., WiFi, Bluetooth, cellular, etc.) network, or combination thereof and enable device 702 to communicate with network component(s) 722, which may be embodied as, or within, calling device 120.

Additionally or alternatively, one or more other networks may be utilized. For example, network 724 may represent a second network, which may facilitate communication with components utilized by device 702. For example, network 724 may be an internal network to an enterprise whereby components are trusted (or at least more so) that networked components 722, which may be connected to network 720 comprising a public network (e.g., Internet) that may not be as trusted. Components attached to network 724 may include memory 726, data storage 728, input/output device(s) 730, and/or other components that may be accessible to processor 704. For example, memory 726 and/or data storage 728 may supplement or supplant memory 706 and/or data storage 708 entirely or for a particular task or purpose. For example, memory 726 and/or data storage 728 may be an external data repository (e.g., server farm, array, "cloud," etc.) and allow device 702, and/or other devices, to access data thereon. Similarly, input/output device(s) 730 may be accessed by processor 704 via input/output interface 712 and/or via communication interface 710 either directly, via network 724, via network 720 alone (not shown), or via networks 724 and 720.

It should be appreciated that computer readable data may be sent, received, stored, processed, and presented by a variety of components. It should also be appreciated that components illustrated may control other components, whether illustrated herein or otherwise. For example, one input/output device 730 may be a router, switch, port, or other communication component such that a particular output of processor 704 enables (or disables) input/output device 730, which may be associated with network 720 and/or network 724, to allow (or disallow) communications between two or more nodes on network 720 and/or network 724.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a microprocessor having a memory;
a data storage accessible to the microprocessor;
a network interface to a network to enable a communication comprising the system and a calling device via the network; and
the microprocessor performs:
receiving a signal associated with an incoming communication request via the network;
selecting, from the data storage, an auto-answer rule from a plurality of rules, the selection in accordance with a datum within the signal;
accessing an auto-answer attribute; and
evaluating the auto-answer attribute with the auto-answer rule to produce an auto-answer decision to auto-answer or not auto-answer an incoming communication associated with the incoming communication request; and upon the auto-answer decision being evaluated to auto-answer the incoming communication, connecting to the incoming communication to enable a real-time communication session comprising the system and the calling device; and wherein the incoming communication request comprises a plurality of communication types and wherein the microprocessor performs connecting to the incoming communication to enable the real-time communication session with the calling device, comprising connection less than all of the plurality of communication types.

2. The system of claim 1, wherein the auto-answer decision is to not auto-answer the incoming communication, performing a non-auto-answer action comprising at least one of routing the incoming communication request to another communication device, routing the incoming communication request to voicemail, responding to the incoming communication request with a busy signal.

3. The system of claim 1, wherein the system is embodied as a user communication device.

4. The system of claim 3, further comprising:
at least one of:
a speaker;
a microphone;
a video display; or
a camera; and
wherein auto-connecting the incoming communication enables an associated at least one of:
the speaker to convert at least a portion of data encoded within the auto-answered incoming communication into sound waves;
the microphone to convert sound waves into at least a portion of the data encoded into the auto-answered incoming communication;
the video display to convert at least a portion of the data encoded within the auto-answered incoming communication into visual images; or
the camera to convert visual images into at least a portion of the data encoded into the auto-answered incoming communication.

5. The system of claim 1, wherein the microprocessor comprises a plurality of intercommunicating microprocessors.

6. The system of claim 1, further comprising:
a user communication device; and
upon making the decision, by the microprocessor, to auto-answer the incoming communication, connecting to the incoming communication to enable a real-time communication session between the calling device and the user communication device, wherein the user communication device receives and presents at least a portion of the data encoded within the auto-answered incoming communication to and from at least one form of human perceivable communication.

7. The system of claim 1, wherein the data storage is a portion of a data storage device.

8. The system of claim 1, wherein the auto-answer rule is evaluated with the auto-answer attribute comprising determining whether the auto-answer attribute identifies at least one of the calling device or a user associated with the incoming communication request with an entry in a contact record, maintained in the data storage, that comprises the auto-answer attribute.

9. The system of claim 1, wherein the auto-answer rule is evaluated with the auto-answer attribute comprising at least one of an attribute of an identity of the calling device, an attribute of an identity of a calling user associated with the calling device, or an attribute of the incoming communication request, further comprise at least one of time of day, day of week, day of month, day of year.

10. A method for selectively auto-answering an incoming communication request by a microprocessor, comprising:
receiving a signal associated with an incoming communication request via a network;
accessing, from a data storage, an auto-answer rule;
accessing an auto-answer attribute;
evaluating the auto-answer attribute with the auto-answer rule to produce an auto-answer decision to auto-answer or not auto-answer an incoming communication associated with the incoming communication request; and
upon the auto-answer decision being evaluated to auto-answer the incoming communication, connecting to the incoming communication to enable a real-time communication session comprising a user communication device and a calling device originating the incoming communication request; and
wherein the incoming communication request comprises a plurality of communication types and the auto-answering further comprises, enabling less than all of the plurality of communication types to the user communication device.

11. The method of claim 10, wherein the auto-answer decision is to not auto-answer the incoming communication, performing a non-auto-answer action comprising at least one of routing the incoming communication request to another communication device, routing the incoming communication request to voicemail, responding to the incoming communication request with a busy signal.

12. The method of claim 10, wherein the auto-answer decision is to auto-answer the incoming communication, performing at least one of:
converting at least a portion of data encoded within the auto-answered incoming communication into sound waves by a speaker;
converting sound waves into at least a portion of the data encoded into the auto-answered incoming communication by a microphone;
converting at least a portion of the data encoded within the auto-answered incoming communication into visual images for presentation on a video display; or
converting visual images into at least a portion of the data encoded into the auto-answered incoming communication by a camera.

13. The method of claim 10, wherein evaluating the auto-answer attribute with the auto-answer rule further comprises determining whether the auto-answer attribute identifies at least one of the calling device or a user associated with the incoming communication request with an entry in a contact record, maintained in a data storage, that comprises the auto-answer attribute.

14. The method of claim 13, wherein evaluating the auto-answer attribute comprises a group auto-answer attribute and further determining whether at least one of the attribute of the identity of the calling device or the attribute of the identity of a calling user associated with the calling device is a member of a group having the group auto-answer attribute.

15. The method of claim 10, wherein evaluating the auto-answer attribute with the auto-answer rule further comprising utilizing at least one of an attribute of an identity of the calling device, an attribute of an identity of a calling user associated with the calling device, or an attribute of the incoming communication request, further comprise at least one of time of day, day of week, day of month, day of year for evaluation with the auto-answer rule.

16. A system for selectively auto-answering an incoming communication request by a microprocessor, comprising:
   means to receive a signal associated with an incoming communication request via a network;
   means to access, from a data storage, an auto-answer rule;
   means to access an auto-answer attribute;
   means to evaluate the auto-answer attribute with the auto-answer rule to produce an auto-answer decision to auto-answer or not auto-answer an incoming communication associated with the incoming communication request; and
   means to connect, upon the means to evaluate auto-answer decision is evaluated to auto-answer the incoming communication, to the incoming communication to enable a real-time communication session comprising a user communication device and a calling device originating the incoming communication request; and
   wherein the incoming communication request comprises a plurality of communication types and the auto-answering further comprises, means to enable less than all of the plurality of communication types to the user communication device.

17. The system of claim 16, wherein the means to evaluate the auto-answer attribute with the auto-answer rule further comprises means to determine whether the auto-answer attribute identifies at least one of the calling device or a user associated with the incoming communication request with an entry in a contact record, maintained in a data storage, that comprises the auto-answer attribute.

18. The system of claim 16, wherein the means to evaluate the auto-answer decision, upon determining to not auto-answer the incoming communication, further comprises means to perform a non-auto-answer action comprising at least one of routing the incoming communication request to another communication device, routing the incoming communication request to voicemail, responding to the incoming communication request with a busy signal.

19. The system of claim 16, wherein the means to determine the auto-answer decision, upon determining to auto-answer the incoming communication, further comprise at least one of:
   means to convert at least a portion of data encoded within the auto-answered incoming communication into sound waves;
   means to convert sound waves into at least a portion of the data encoded into the auto-answered incoming communication;
   means to convert at least a portion of the data encoded within the auto-answered incoming communication into visual images; or
   means to convert visual images into at least a portion of the data encoded into the auto-answered incoming communication.

20. The system of claim 16, wherein the means to evaluate the auto-answer attribute with the auto-answer rule, further comprises means to utilize at least one of an attribute of an identity of the calling device, an attribute of an identity of a calling user associated with the calling device, or an attribute of the incoming communication request, further comprise at least one of time of day, day of week, day of month, day of year for evaluation with the auto-answer rule.

* * * * *

UNITED STATES PATENT AND TRADEMARK OFFICE
CERTIFICATE OF CORRECTION

PATENT NO. : 11,470,195 B2
APPLICATION NO. : 16/690790
DATED : October 11, 2022
INVENTOR(S) : Arjun Sharma et al.

Page 1 of 1

It is certified that error appears in the above-identified patent and that said Letters Patent is hereby corrected as shown below:

In the Claims

Column 15, Line 10, Claim 1 delete "connection" and insert --connecting-- therein.

Column 15, Line 52, Claim 6 after "portion of" please delete "the" therein.

Signed and Sealed this
Third Day of January, 2023

Katherine Kelly Vidal
*Director of the United States Patent and Trademark Office*